United States Patent [19]

Yoshida

[11] Patent Number: 5,335,037

[45] Date of Patent: Aug. 2, 1994

[54] CAMERA PROVIDED WITH LIGHT EMITTING DEVICE

[75] Inventor: Hideo Yoshida, Omiya, Japan

[73] Assignee: Fuji Photo Optical Co., Ltd., Omiya, Japan

[21] Appl. No.: 974,458

[22] Filed: Nov. 12, 1992

[30] Foreign Application Priority Data

Nov. 12, 1991 [JP] Japan ............................ 3-101371[U]

[51] Int. Cl.$^5$ .......................... G03B 17/02; G03B 3/00
[52] U.S. Cl. ................................ 354/288; 354/403
[58] Field of Search ............................. 354/288, 403

[56] References Cited

U.S. PATENT DOCUMENTS

| | | | |
|---|---|---|---|
| 4,538,062 | 8/1985 | Shishido | 354/403 |
| 4,556,787 | 12/1985 | Shishido et al. | 354/403 X |
| 4,827,300 | 5/1989 | Lam | 354/403 X |
| 4,905,034 | 2/1990 | Tejima et al. | 354/403 |
| 4,949,115 | 8/1990 | Tejima et al. | 354/403 |
| 5,099,112 | 3/1992 | Kamitani et al. | 354/403 X |

*Primary Examiner*—Michael L. Gellner
*Assistant Examiner*—Jae N. Noh
*Attorney, Agent, or Firm*—Ronald R. Snider

[57] ABSTRACT

A camera provided with a light emitting device with a light shielding member attached thereto. The light shielding member provided on the light emitting surface of the light emitting device except for an opening for projecting light therethrough is provided integrally with an adapter for attaching the light emitting device to the camera body. It is therefore possible to dispose the light shielding member on the light emitting surface of the light emitting device simultaneously with the attachment of the light emitting device to the camera body, thereby dispensing with the step for attaching the light shielding member to the light emitting device, and enhancing the positional accuracy of the light emitting device attached to the camera body. The opening of the adapter has, for example, a rectangular shape in which the width in the direction perpendicular to the direction of the base length is larger than the width in the direction of the base length, thereby increasing the quantity of light emitted, and enhancing the detection efficiency.

4 Claims, 3 Drawing Sheets

CAMERA PROVIDED WITH LIGHT EMITTING DEVICE

BACKGROUND OF THE INVENTION

This application claims the priority of Japanese Patent Application No. 3-101371 (UM) filed on Nov. 12, 1991 which is incorporated herein by reference.

1. Field of the Invention

The present invention relates to a camera provided with a light emitting device for active autofocusing control.

2. Description of the Related Art

In active autofocusing control in cameras, the subjective distance is measured by projecting a light beam from a light emitting device onto the object of photography and receiving the light reflected from the object by a light receiving device. FIG. 5 shows the arrangement on the front surface of a camera. As shown in FIG. 5, a finder 2 and a lens barrel 4 holding a lens 3 are disposed on the front surface of the camera 1, and a light emitting device (light emitting diode) 5 for emitting infrared light and a light receiving device (photodiode) 6 are arranged in a horizontal line.

FIGS. 6A and 6B show an arrangement for attaching the light emitting device 5 to a camera body 9 through an adapter frame 8. The light emitting device 5 is provided therein with a light emitting (diode) chip 5A, and a light shielding mask (light shielding member) 10 as a separate member is provided on the light emitting surface of the light emitting chip 5A except for an opening 10A. A photographing lens 11 is provided on the camera body 9. According to the light emitting device 5, it is possible to shield the light emitted from the light emitting chip 5A and scattered to the circumference by the light shielding mask 10 and to project a light beam having a predetermined intensity and a predetermined diameter onto the object. When the light projected onto the object and reflected therefrom is received by the light receiving device 6, the subject distance is measured and the autofocusing (AF) step number is output. In accordance with the information on the AF step number, the photographing lens 11 is driven, thereby focusing the lens 11 on the object.

However, in the conventional arrangement for attaching the light emitting device 5 to the camera body 9, since the light shielding mask 10 is attached to the light emitting surface of the light emitting device 5 and the light emitting device 5 is in turn attached to the adapter frame 8, attachment of the light emitting device 5 including the light shielding mask 10 is laborious, and it is difficult to accurately position the light beam which is formed at the opening 10A of the light shielding mask 10. In autofocusing control, since the subject distance is measured from the position at which the beam is received by the light receiving device 6, if the position at which the light beam is formed by the light emitting device 5 is inaccurate, an error is produced in measuring the subject distance.

FIGS. 3 and 4 show the state in which the subject distance is measured. As shown in FIG. 3, when beams are projected from the light emitting device 5 onto the objects at different distances $P_1$, $P_2$, the beams reflected from the objects are received by the light receiving device 6 through a light receiving lens 7. At this time, the light receiving device 6 receives the beam reflected from the object which is at a distance of $P_1$ at a position $P_1$, and the beam reflected from the object which is at a distance of $P_2$ at a position $P_2$ in the direction of the base length which connects the light emitting device 5 and the light receiving device 6. It is therefore possible to specify the subject distance from the position (center of gravity) at which the beam is received by the light receiving device 6. The AF step number which corresponds to the subject distance is allotted to the light receiving device 6 for the purpose of autofocusing control, for example, as shown in FIG. 4. The AF step number n is determined from the center 200 of gravity of the received beam 100. Consequently, if the position to which the light emitting device 5 projects a light beam shifts, the position at which the light receiving device 6 receives the beam also shifts. It is therefore important to set the position to which the light emitting device 5 projects a light beam, and it is necessary to accurately arrange the light emitting device 5 on the adapter frame 8 and the light shielding mask 10 on the light emitting device 5.

However, since the light shielding mask 10 is a separate body in the conventional arrangement, it is necessary to maintain the accuracy with which the light emitting device 5 is attached to the adapter frame 8 and the accuracy with which the light shielding mask 10 is attached to the light emitting device 5 separately from each other, which leads to a rise in the cost.

SUMMARY OF THE INVENTION

Accordingly, it is an object of the present invention to eliminate the above-described problems in the related art and to provide a camera provided with a light emitting device for autofocusing control which facilitates the attachment of a light shielding member, which is capable of enhancing the positional accuracy of the light emitting device attached to the camera body, and which is capable of reducing the cost for attaching the light emitting device to the camera body.

To achieve this aim, a camera according to the present invention comprises: a light receiving device for autofocusing control; a light emitting device for autofocusing control; and a light shielding member provided on the light emitting surface of the light emitting device except for an opening for projecting light therethrough, wherein the light shielding member is provided integrally with an adapter for the light emitting device. According to this structure, since the light shielding member is disposed on the light emitting surface of the light emitting device simultaneously with the attachment of the light emitting device to a predetermined position of the adapter, the step for attaching the light shielding member is dispensed with and the positional accuracy of the light emitting device attached to the camera body is enhanced.

It is preferable to form a lens portion having a convex surface on the light emitting surface of the light emitting device. This lens portion enables good light diffusion and facilitates the positioning of the light emitting device at the opening.

The opening of the adapter preferably has a tapered wall which enlarges in the direction of light projection.

The opening of the adapter preferably has a rectangular shape in which the width in the direction perpendicular to the direction of the base length which connects the light emitting device and the light receiving device is larger than the width in the direction of the base length. According to this structure, it is possible to increase the quantity of light emitted while preventing an error in detection of the position (center of gravity) at which the beam is received which is caused by a beam breakage in the direction of the base length. In other words, if there is a horizontal breakage in the received beam, the position (center of gravity) at which the beam is received shifts and an error is caused in the detected distance. It is therefore unfavorable to increase the width of the opening in the direction of the base length.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1A:
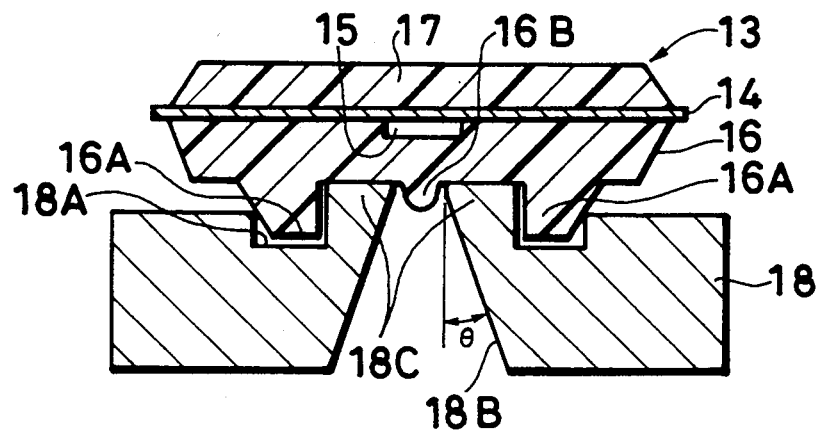
FIG. 1A is a sectional view of a light emitting device attached to an adapter frame in an embodiment of a camera according to the present invention.
Figure 1B:
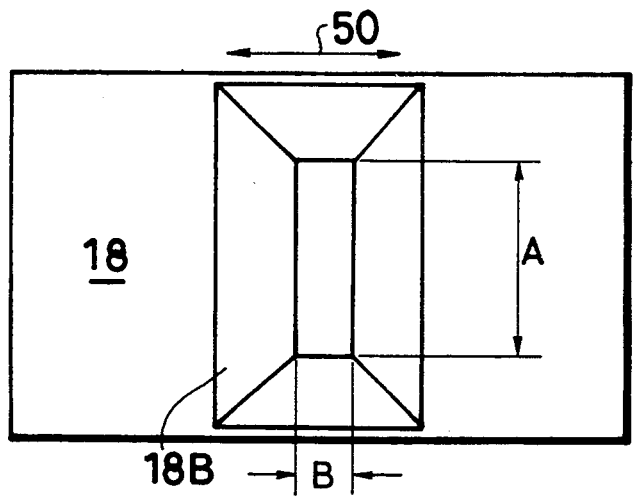
FIG. 1B is a bottom view of the light emitting device shown in FIG. 1A.
Figure 6A:
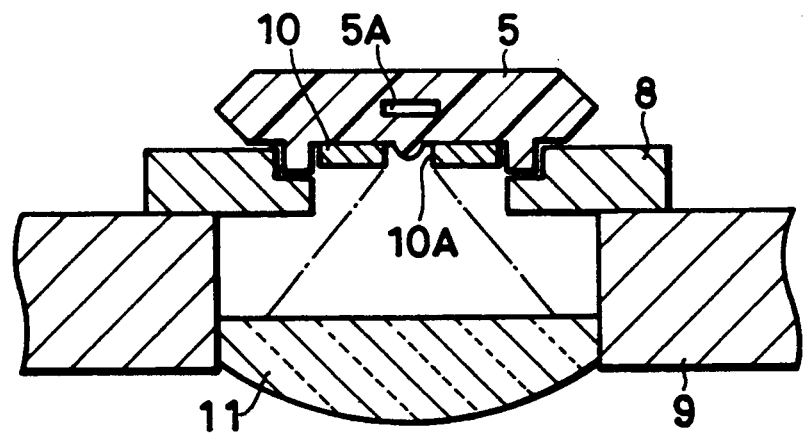
FIG. 6A is a sectional view of a conventional camera to which a light emitting device is attached.
Figure 6B:
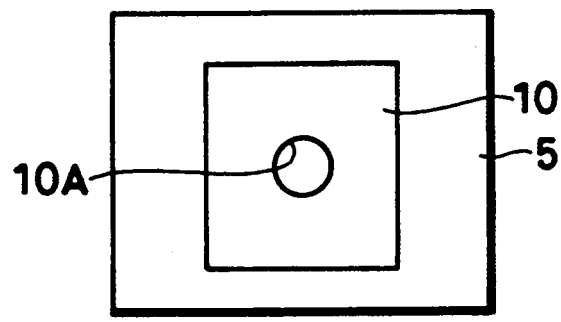
FIG. 6B shows the light emitting surface of the light emitting device shown in FIG. 6A.

FIG. 1A is a sectional view of a light emitting device attached to an adapter frame in an embodiment of a camera according to the present invention, and FIG. 1B is a bottom view thereof. As shown in FIG. 1A, a light emitting device 13 is composed of a lead frame 14, a light emitting (diode) chip 15 for emitting infrared light attached to the lead frame 14, and resin molds 16, 17 (at least the resin mold 16 is a transparent member) which are formed on the upper surface and the under surface of the lead frame 14 in such a manner as to cover the light emitting chip 15. Protruding portions 16A are formed on the resin mold 16. An adapter frame 18 is provided with engaging grooves 18A for engaging the protruding portions 16A. An opening 18B for emitting light from the light emitting chip 15 therethrough is formed on the adapter frame 18. The opening 18B has a tapered shape which enlarges toward the end portion at a predetermined angle 8. Light shielding portions 18C project toward the light emitting device 13 are formed at the upper portion of the opening 18B at a height which brings the light shielding portions 18C into contact with the light emitting surface of the light emitting device 13. In this embodiment, a lens portion 16B is formed at the portion of the resin mold 16 which is situated in the opening 18B. The lens portion 16B both diffuses light and facilitates the positioning of the light emitting device 13. That is, the light emitting device 13 is positioned at a predetermined position of the adapter frame 18 by the protruding portions 16A which engage the engaging grooves 18A with the lens portion 16B which is disposed in the opening 18B. In this embodiment, the opening 18B of the light emitting device 13 has a rectangular shape. As shown in FIG. 1B, the width A of the opening in the direction perpendicular to the direction 50 of the base length is larger than the width B of the opening in the direction 50 of the base length, thereby enabling the measuring operation with high accuracy. In the conventional camera, the opening 10A has a circular shape of about the same size as the light emitting chip 5A, as shown in FIG. 6A and 6B. In this case, the light emitted from the light emitting chip 5A is not utilized effectively but wasted. In this embodiment, in order to suppress a change in the center of gravity which causes a beam breakage, the width A of the opening 18B in the direction perpendicular to the direction 50 of the base length is increased as much as possible so as to utilize as large an amount of light as possible which is output from the light emitting chip 15 for light projection, while leaving the width B of the opening 18B as it is (because if the width B of the opening 18B is increased, the center of gravity easily shifts), Since it is possible to increase the amount of light emitted as compared with a conventional camera, it is possible to detect the beams with stability in a short time.

Figure 2:
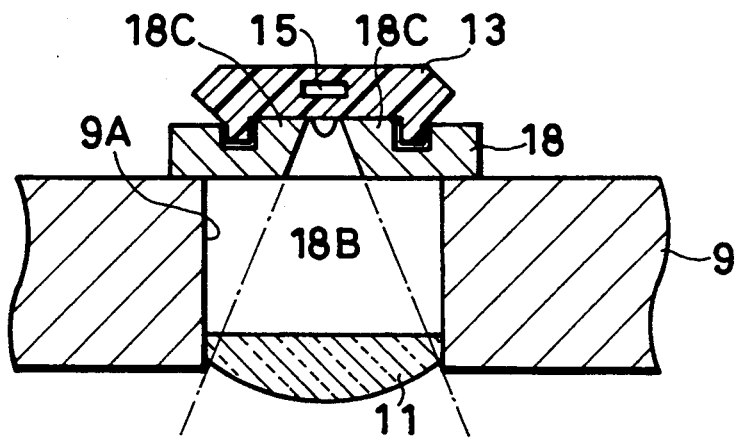
FIG. 2 is a sectional view of the embodiment of a camera in the state in which the light emitting device shown in FIG. 1A is attached to the camera body.
Figure 3:
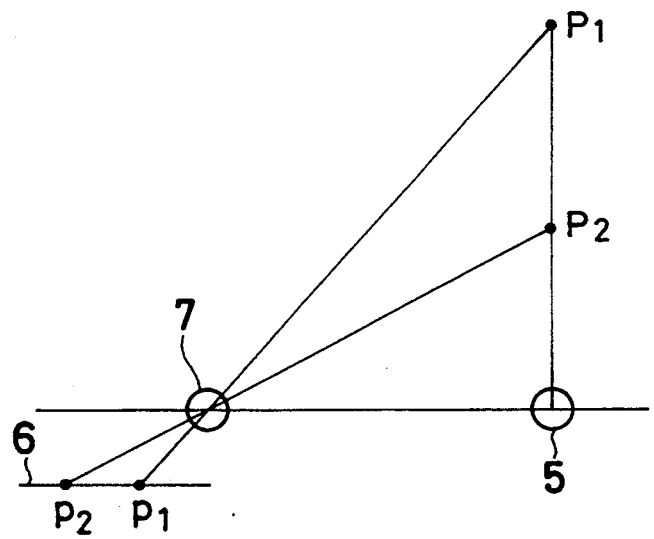
FIG. 3 shows infrared light beams projected and received for the purpose of measurement of the subject distance.
Figure 4:
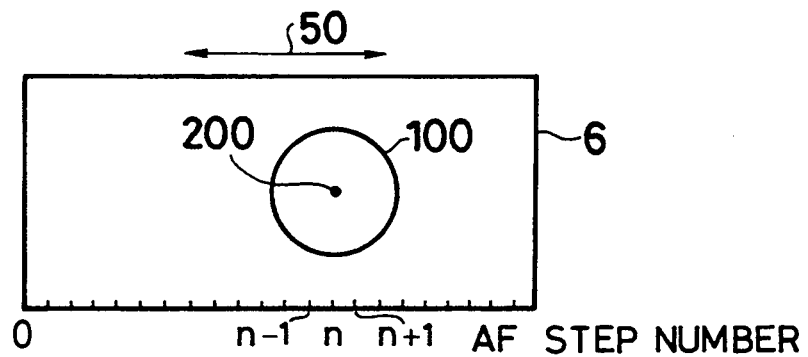
FIG. 4 shows the infrared beams shown in FIG. 3 received by the light receiving device.
Figure 5:
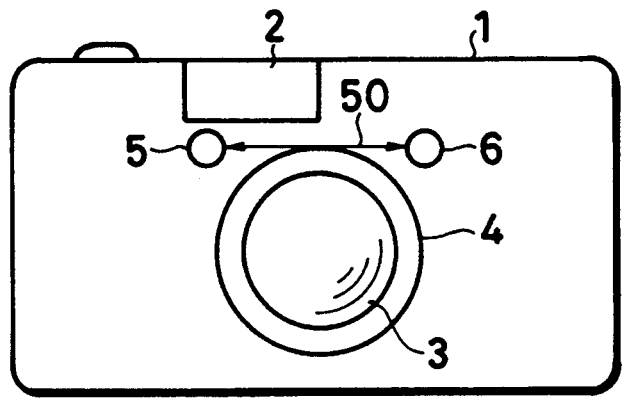
FIG. 5 shows the arrangement on the front surface of the embodiment shown in FIG. 2.

FIG. 2 shows the positional relationship between the adapter frame 18 on which the light emitting device 13 is disposed and the camera body 9. A light passage 9A is provided in the camera body 9, and a light emitting lens 11 is disposed in the light passage 9A. The light beams output from the light emitting device 13 are therefore projected onto the object through the light emitting lens 11.

According to the embodiment having the above-described structure, by engaging the protruding portions 16A of the resin mold 16 of the light emitting device 13 with the engaging grooves 18A of the adapter frame 18, the light emitting device 13 is positioned at a predetermined position, and simultaneously a predetermined region of the light emitting surface of the light emitting device 13 is shielded from light by the light shielding portions 28C which are integral with the adapter frame 18. It is therefore not necessary to attach the conventional light shielding mask 10 as a separate body. As a result, it is easy to position the light emitting device 13 having the light shielding portions 18C at a predetermined position of the camera body 9 and, in addition, the positional accuracy of the light emitting device 13 attached to the camera body 9 is enhanced.

Although the opening 18B of the adapter frame 18 has a rectangular shape in this embodiment, the shape is not restricted thereto and it may naturally be an oval, a circle or a square in correspondence with the desired section of the beam which is projected from the light emitting device 13.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A camera provided with a light emitting device comprising:

a light emitting device for autofocusing control;

a light receiving device for sensing the light emitted from the emitting device and reflected from a subject to detect light-receiving positions which vary in the direction of a base length joining the light emitting device and the light receiving device with the distance to the subject;

an adapter for attaching said light emitting device to the camera body;

a light-shielding member integrated in said adapter in such a manner as to cover the light emitting device with an opening provided to project light through when said light emitter is attached to said adapter; and an opening in said adapter having a larger width of said opening in the direction perpendicular to the direction of the base length than the width of said opening in the direction of the base length for increasing the quantity of light emitted.

2. A camera provided with a light emitting device according to claim 1, wherein said light emitting device is provided with a lens portion having a convex surface on the light emitting surface thereof.

3. A camera provided with a light emitting device according to claim 1, wherein said opening of said adapter preferably has a tapered wall which enlarges in the direction of light projection.

4. A camera provided with a light emitting device according to claim 1, wherein said opening of said adapter has a rectangular shape.

* * * * *